United States Patent
Ebihara

(10) Patent No.: US 9,762,825 B2
(45) Date of Patent: Sep. 12, 2017

(54) METHOD AND SYSTEM FOR REDUCING ANALOG-TO-DIGITAL CONVERSION TIME FOR DARK SIGNALS

(71) Applicant: OMNIVISION TECHNOLOGIES, INC., Santa Clara, CA (US)

(72) Inventor: Hiroaki Ebihara, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/985,122

(22) Filed: Dec. 30, 2015

(65) Prior Publication Data

US 2017/0195597 A1    Jul. 6, 2017

(51) Int. Cl.

| H04N 9/64 | (2006.01) |
|---|---|
| H04N 5/228 | (2006.01) |
| H03M 1/12 | (2006.01) |
| H04N 5/361 | (2011.01) |
| H04N 5/378 | (2011.01) |
| H04N 5/372 | (2011.01) |

(52) U.S. Cl.
CPC .............. *H04N 5/361* (2013.01); *H04N 5/372* (2013.01); *H04N 5/378* (2013.01)

(58) Field of Classification Search
CPC ..... H03M 1/00; H04N 5/3355; H04N 5/3745; H04N 5/378
USPC ....... 348/243, 251, 222.1; 358/529; 341/155
See application file for complete search history.

(56) References Cited

U.S. PATENT DOCUMENTS

| 7,265,784 B1* | 9/2007 | Frank ................. H04N 5/2351 348/222.1 |
|---|---|---|
| 2005/0012840 A1* | 1/2005 | Hsieh ............... H01L 27/14609 348/308 |
| 2007/0229126 A1* | 10/2007 | Nam .................... H04N 5/3575 327/131 |
| 2010/0097501 A1* | 4/2010 | Fowler ................. H04N 5/361 348/241 |
| 2012/0013780 A1* | 1/2012 | Mo ....................... H04N 5/347 348/308 |
| 2012/0138775 A1* | 6/2012 | Cheon .................. H04N 5/361 250/208.1 |
| 2012/0212657 A1 | 8/2012 | Mo et al. |
| 2014/0027611 A1* | 1/2014 | Patel .................... H04N 5/361 250/208.1 |
| 2014/0117210 A1 | 5/2014 | Wakabayashi et al. |

* cited by examiner

*Primary Examiner* — Xi Wang

(74) *Attorney, Agent, or Firm* — Christensen O'Connor Johnson Kindness PLLC

(57) ABSTRACT

A method for reducing ADC time for dark signals starts with pixel array capturing image data of frames including first frame and second frame. Pixel array includes visible pixels and black pixels (OPB). Scanning circuitry then selects OPB of first frame to be readout. OPB generate a dark signal when selected by scanning circuitry. Column readout circuitry included in readout circuitry then acquires the dark signal of first frame and processes the dark signal based on a ramp signal received from ramp generator included in readout circuitry to generate dark ADC output. Readout circuitry then determines a ramp timing offset based on the dark signal of first frame. The ramp timing offset is then applied to the second frame, which includes generating by the ramp generator the ramp signal for a second frame that includes the ramp timing offset. Other embodiments are described.

18 Claims, 9 Drawing Sheets

METHOD AND SYSTEM FOR REDUCING ANALOG-TO-DIGITAL CONVERSION TIME FOR DARK SIGNALS

FIELD

An example of the present invention relates generally to image sensors. More specifically, examples of the present invention are related to methods and systems for reducing the analog-to-digital conversion (ADC) time for dark signals and thereby, increasing the frame rate.

BACKGROUND

High speed image sensors have been widely used in many applications in different fields including the automotive field, the machine vision field, and the field of professional video photography. The technology used to manufacture image sensors, and in particular, complementary-metal-oxide-semiconductor (CMOS) image sensors, has continued to advance at great pace. For example, the demand of higher frame rates and lower power consumption has encouraged the further miniaturization and integration of these image sensors.

CMOS image sensors have to take into account the dark current on photo diodes or floating diffusion of pixels. The dark current appears as dark signal when the image signal from a pixel array is readout. In current image sensor systems, the summation of the signal and dark signal are readout at the same time. Thus, when processing the image signal, there is an ADC time for the dark signal.

Current contact image sensors (CIS) often have optical black pixels read out dark signals. The dark signals read out from the optical black pixels are subtracted from the output signal of the visible pixel (or visible signal) to extract the real signal. Prior art solutions to subtract the dark signal from the visible signal include (i) subtracting dark signal in the digital domain and (ii) subtracting dark signal in the analog domain.

In one prior art, after ADC, the dark signal is subtracted from the visible pixel signal output such that there is a need to first convert from analog to digital the sum of the dark signal and the visible signal. In another prior art, the dark signal is subtracted from the visible signal in the analog domain before the ADC. In this prior art, while there is no ADC time for the dark signal, there is a need for special analog circuits to subtract the dark signal. These analog circuits create a requirement of space and power and often worsen horizontal random noise. Further, the analog circuits are not sufficiently precise such that digital black level correction (BLC) is needed in addition to the analog BLC.

BRIEF DESCRIPTION OF THE DRAWINGS

The embodiments of the invention are illustrated by way of example and not by way of limitation in the figures of the accompanying drawings in which like references indicate similar elements throughout the various views unless otherwise specified. It should be noted that references to "an" or "one" embodiment of the invention in this disclosure are not necessarily to the same embodiment, and they mean at least one. In the drawings.

Figure 1:
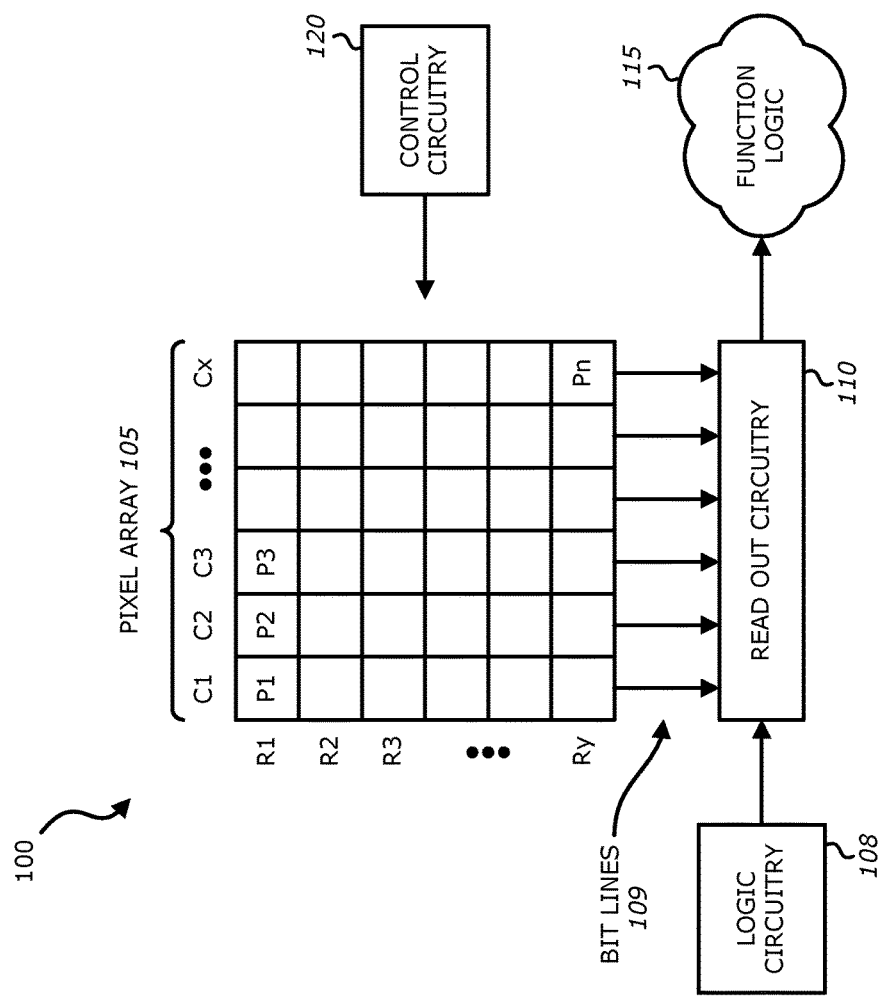
FIG. 1 is a block diagram illustrating an example imaging system that implements a reduction in ADC time for dark signals in accordance to one embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. However, it is understood that embodiments of the invention may be practiced without these specific details. In other instances, well-known circuits, structures, and techniques have not been shown to avoid obscuring the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Particular features, structures or characteristics may be included in an integrated circuit, an electronic circuit, a combinatorial logic circuit, or other suitable components that provide the described functionality.

Examples in accordance with the teaching of the present invention describe an image sensor that reduces the ADC time for dark signals by changing the start timing on the second ADC conversion based on a determination of the timing offset from the dark signal.

FIG. 1 is a block diagram illustrating an example imaging system 100 that implements a reduction in ADC time for dark signals in accordance to one embodiment of the invention. Imaging system 100 may be a complementary metal-oxide-semiconductor ("CMOS") image sensor. As shown in the depicted example, imaging system 100 includes pixel array 105 coupled to control circuitry 120 and readout circuitry 110, which is coupled to function logic 115 and logic control 108.

Figure 4A:
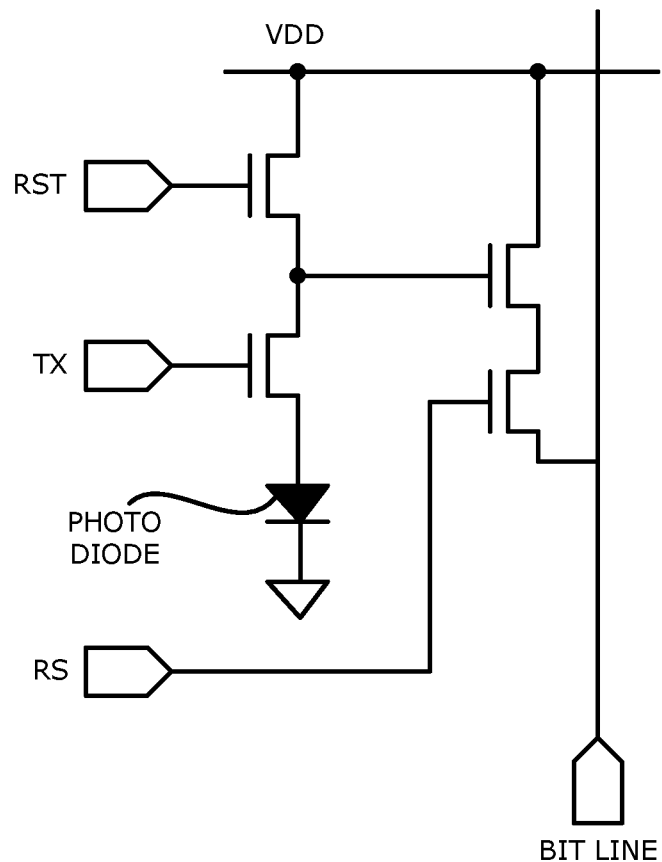
FIG. 4A illustrates an exemplary pixel cell that may be included in pixel array in accordance to one embodiment of the invention.

The illustrated embodiment of pixel array 105 is a two-dimensional ("2D") array of imaging sensors or pixel cells (e.g., pixel cells P1, P2, . . . , Pn). In one example, each pixel cell is a CMOS imaging pixel. Referring to FIG. 4A, an exemplary pixel cell (circuitry) that may be included in pixel array 105 in accordance to one embodiment of the invention is illustrated. Each pixel circuitry includes a photodiode and transistors (e.g., transfer transistor, reset transistor, and select transistor). During operation, transfer transistor receives a transfer signal TX, which transfers the charge accumulated in photodiode to a floating diffusion node (not shown). In one embodiment, floating diffusion node may be coupled to a storage capacitor (not shown) for temporarily storing image charges. The reset and set transistors reset and set the pixel under control of a reset signal RST and the set signal RS. Select transistor is coupled between the power rail VDD and the readout column line. Select transistor selectively couples the output of pixel circuitry to the readout column line.

Referring back to FIG. 1, each pixel cell is arranged into a row (e.g., rows R1 to Ry) and a column (e.g., columns C1 to Cx) to acquire image data of a person, place or object, etc., which can then be used to render an image of the person, place or object, etc. Pixel array 105 includes visible pixels and optical black pixels (OPB). The visible pixels convert the light incident to the pixel to an electrical signal (e.g., a visible signal) and output the visible signal whereas the OPB output a dark signal.

In one example, after each pixel has acquired its image data or image charge, the image data is read out by readout circuitry 110 through readout column bit lines 109 and then transferred to function logic 115. In one embodiment, a logic circuitry 108 can control readout circuitry 110 and output image data to function logic 115. In various examples, readout circuitry 110 may include amplification circuitry (not illustrated), column readout circuitry 220, or otherwise. Function logic 115 may simply store the image data or even manipulate the image data by applying post image effects (e.g., crop, rotate, remove red eye, adjust brightness, adjust contrast, or otherwise). In one example, readout circuitry 110 may read out a row of image data at a time along readout column lines (illustrated) or may read out the image data using a variety of other techniques (not illustrated), such as a serial read out or a full parallel read out of all pixels simultaneously.

In one example, control circuitry 120 is coupled to pixel array 105 to control operational characteristics of pixel array 105. For example, control circuitry 120 may generate a shutter signal for controlling image acquisition. In one example, the shutter signal is a global shutter signal for simultaneously enabling all pixels within pixel array 105 to simultaneously capture their respective image data during a single acquisition window. In another example, the shutter signal is a rolling shutter signal such that each row, column, or group of pixels is sequentially enabled during consecutive acquisition windows. In another example, control circuitry 120 may comprise the horizontal and vertical scanning circuitry which selects the row and/or column of pixels to be read out. Scanning circuitry may include, selection circuitry (e.g., multiplexers), etc. to readout a row or column of image data at a time along readout column bit lines 109 or may readout the image data using a variety of other techniques, such as a serial readout or a full parallel readout of all pixels simultaneously. When scanning circuitry selects the visible pixels in pixel array 105, the visible pixels convert light incident to the pixels to a visible signal and output the visible signal to column readout circuitry 220. When horizontal and vertical scanning circuitry selects the dark pixels in pixel array 105, the dark pixels output the dark signal to column readout circuitry 220. Column readout circuitry 220 may receive the visible signal or the dark signal from scanning circuitry or from pixel array 105.

Figure 2:
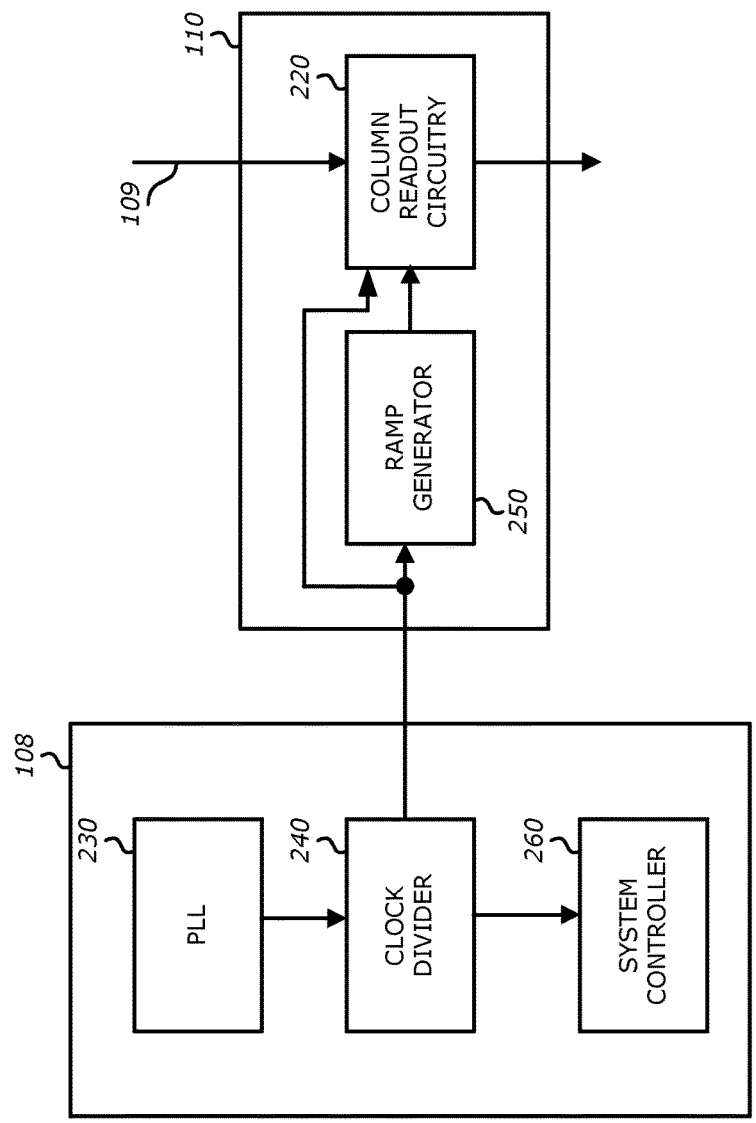
FIG. 2 is a block diagram illustrating the details of readout circuitry and logic circuitry of imaging system in FIG. 1 that implements a reduction in ADC time for dark signals in accordance to one embodiment of the invention.

FIG. 2 is a block diagram illustrating the details of readout circuitry 110 and logic circuitry 108 of imaging system 100 in FIG. 1 that implements a reduction in ADC time for dark signals in accordance to one embodiment of the invention. As shown in FIG. 2, the readout circuitry 110 may include a column readout circuitry 220 and a ramp generator 250. Ramp generator 250 generates a ramp signal that is synchronized to the ADC clock signal.

As shown in FIG. 2, logic circuitry 108 includes a phased locked loop (PLL) 230, a clock divider 240, a ramp generator 250 and a system controller 260. PLL 230 generates a clock signal that is transmitted to clock divider 240. By dividing the clock signal, clock divider 240 generates an ADC clock signal that is transmitted to ramp generator 250 and a system clock signal that is transmitted to system controller 260. System controller 260 generates signals to control each block in image sensor 100 to be synchronized to the system clock. In one embodiment, the readout circuitry determines digital black level correction (BLC) based on the dark signal and applies the digital BLC to the visible signal.

Figure 3:
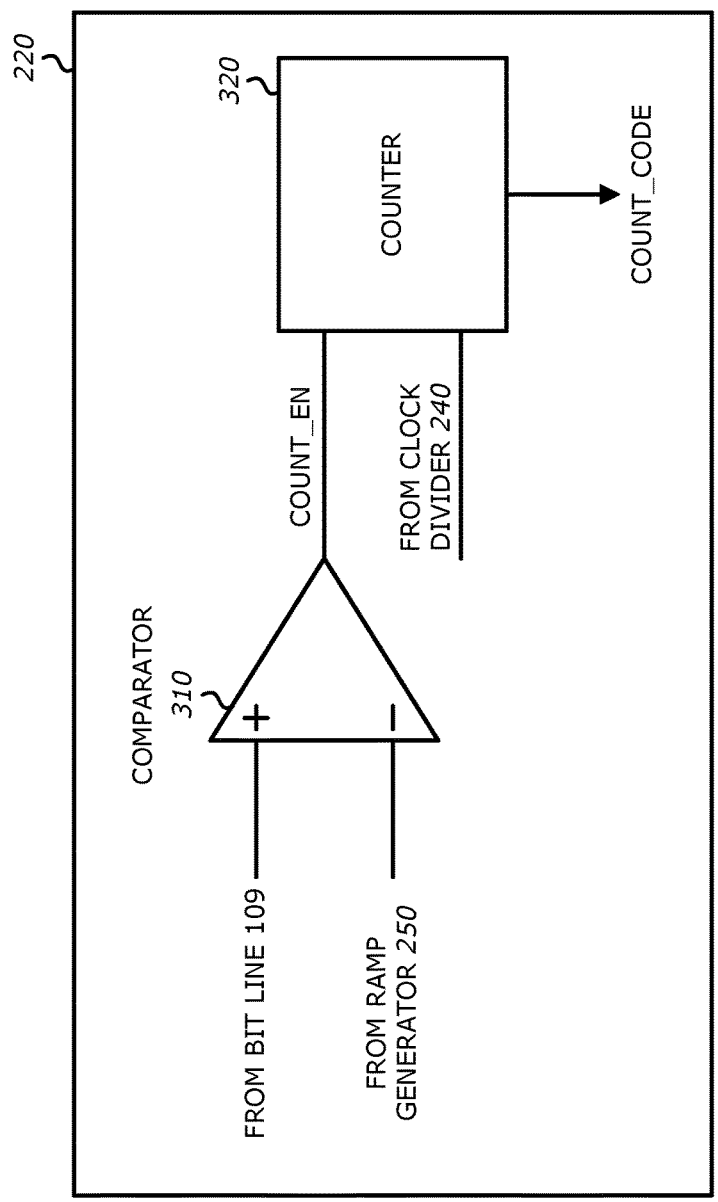
FIG. 3 is a block diagram illustrating the details of column readout circuitry in FIG. 2 in accordance to one embodiment of the invention.

FIG. 3 is a block diagram illustrating the details of column readout circuitry 220 in FIG. 2 in accordance to one embodiment of the invention. While not illustrated, in some embodiments, a plurality of column readout circuitry 220 may be included in readout circuitry 110. In this embodiment, column readout circuitry 220 includes a double ramp ADC. However, the other types of column ADC (i.e., SAR, cyclic, etc) may also be used in other embodiments. It is also understood that column readout circuitry 220 may be similar for each column of pixel array 105. As shown in FIG. 3, column readout circuitry 220 includes a comparator 310 such as a fully differential op amp and a counter 320. Comparator 310 may receive as inputs a ramp signal from ramp generator 250 and visible signals and/or dark signals from the bit line 109. Counter 320 receives the output of comparator 310 and the ADC clock signal from clock divider 240. Counter 320 is enabled to count based on the ADC clock signal until the comparator 310 flips (e.g., signals a non-match). In one embodiment, the ADC clock signal provides a count enable signal (e.g., count_en) to counter 320. Counter 320 may be an asynchronous counter, an arithmetic counter, etc. The output data (e.g., count_code) from the counter 320 may be readout to function logic 115. The output data from counter 320 may also be ADC outputs (e.g., visible ADC output based on the visible signal and dark ADC output based on the dark signal). In one embodiment, function logic 115 receives and processes the ADC outputs to generate a final ADC output.

Figure 4B:
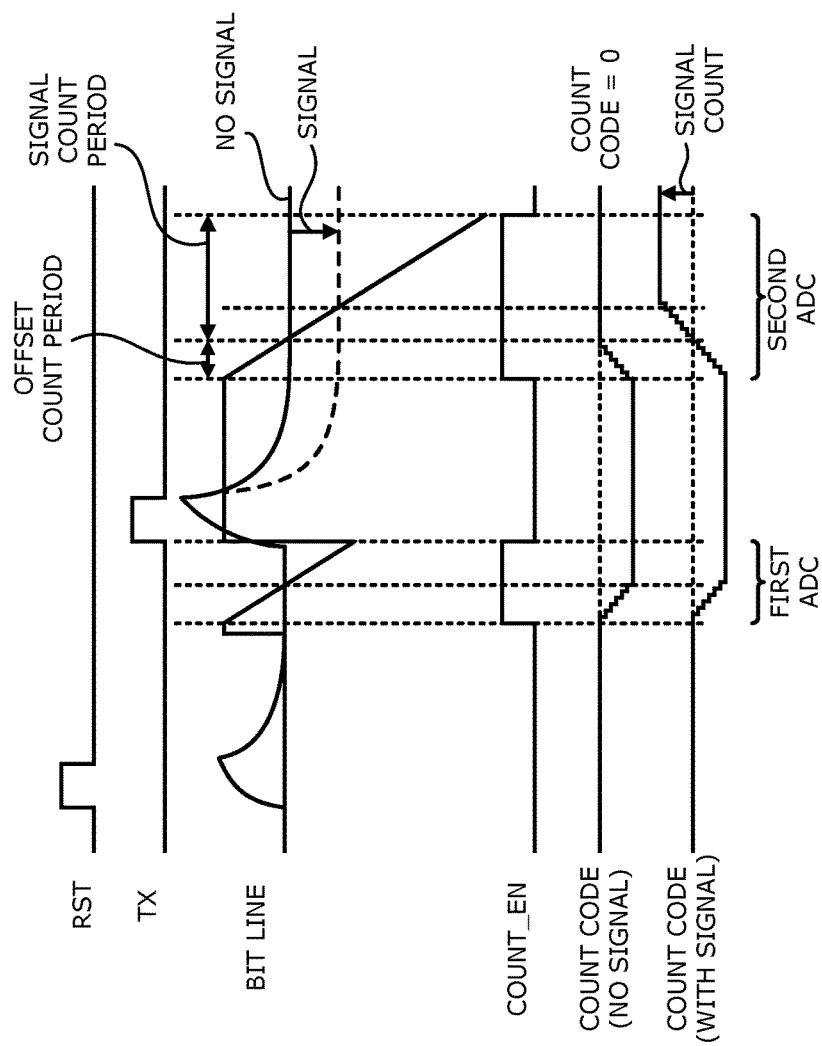
FIGS. 4B-4C are timing diagrams that illustrate the readout signal from a photodiode in FIG. 4A using a double ramp ADC.
Figure 4C:
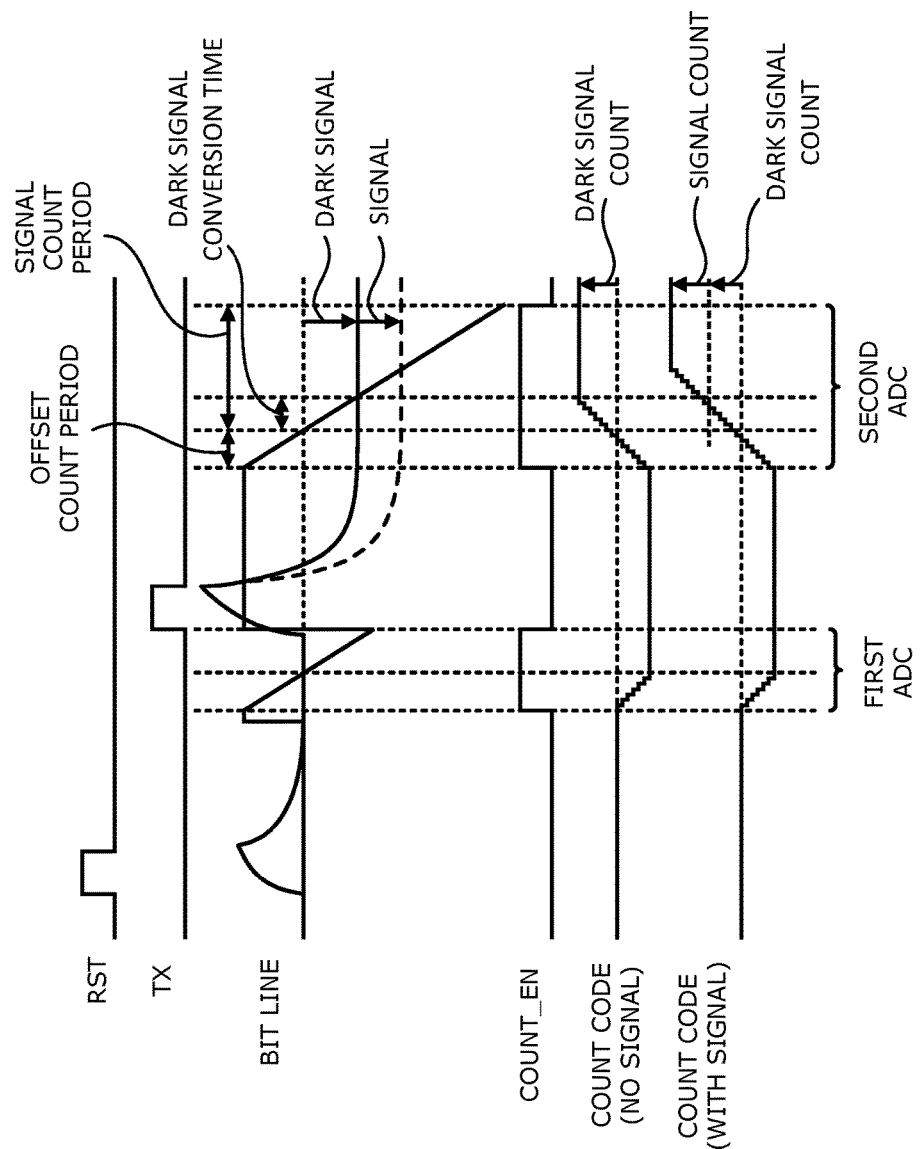

FIGS. 4B-C are timing diagrams that illustrates the readout signal from a photodiode in FIG. 4A using a double ramp ADC. In the basic operation of a double ramp ADC, as shown in FIGS. 4B-4C, the count code of the signal (e.g., final ADC output) that is output from counter 320 is obtained by performing a first and second ADC using a counter. As shown in FIG. 4C, the second ADC output includes the ADC offset, the dark signal and the visible signal. Accordingly, the ADC time of the second ADC output includes an offset count period, a dark signal count period, and a signal count period.

Figure 4D:
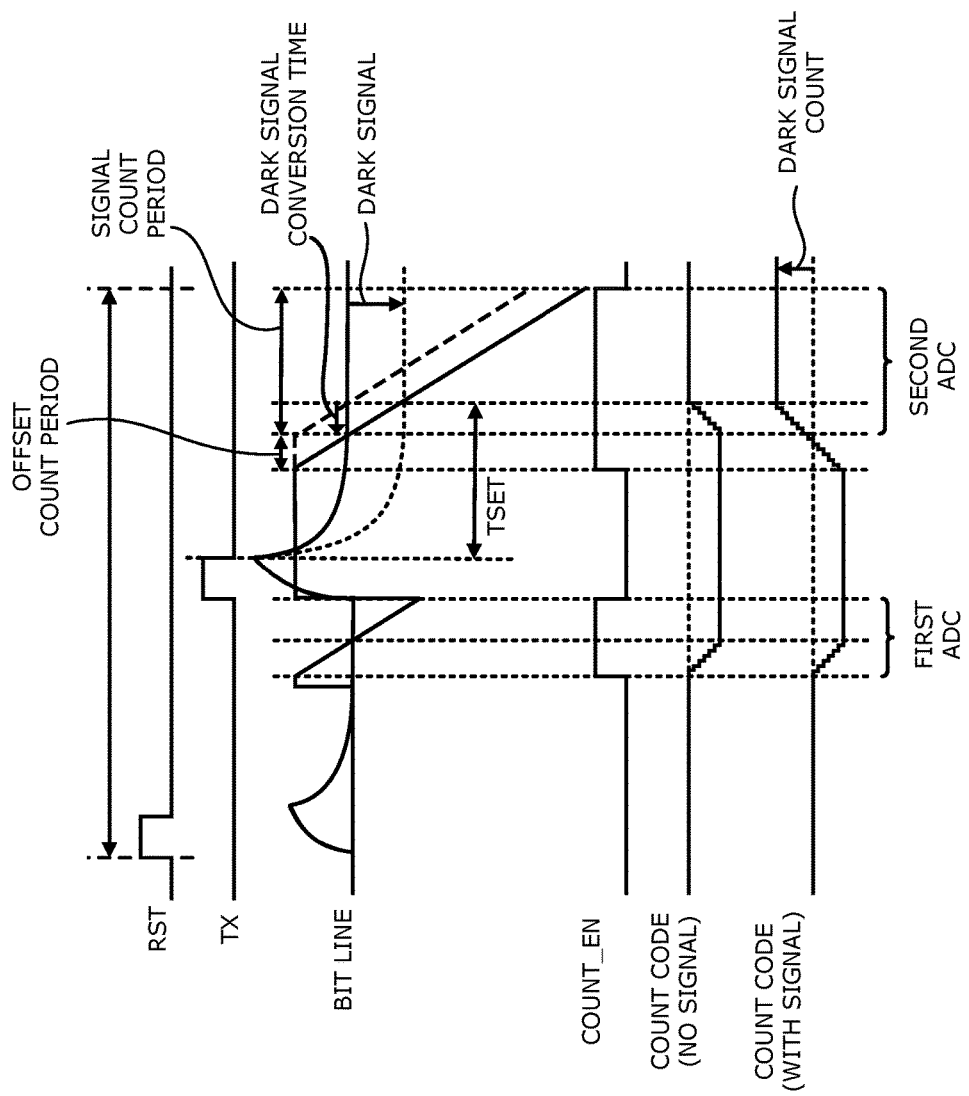
FIG. 4D is a timing diagram that illustrates the readout signal from a photodiode in FIG. 4A using one embodiment of the invention to reduce the ADC time for the dark signal.

FIG. 4D is a timing diagram that illustrates the readout signal from a photodiode in FIG. 4A using one embodiment of the invention to reduce the ADC time for the dark signal. In this embodiment, a timing offset based on the dark signal is applied to the start timing of the second ADC. As shown in FIG. 4D, the second ADC end timing is the same with or without the dark signal if the signals are the same. The period starting from the falling edge of the transfer signal TX to the second ADC (e.g., Tset) is determined by the settling time of the bit line. Accordingly, the ramp start timing may be offset (e.g., brought forward) when processing a dark signal without affecting the image quality.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
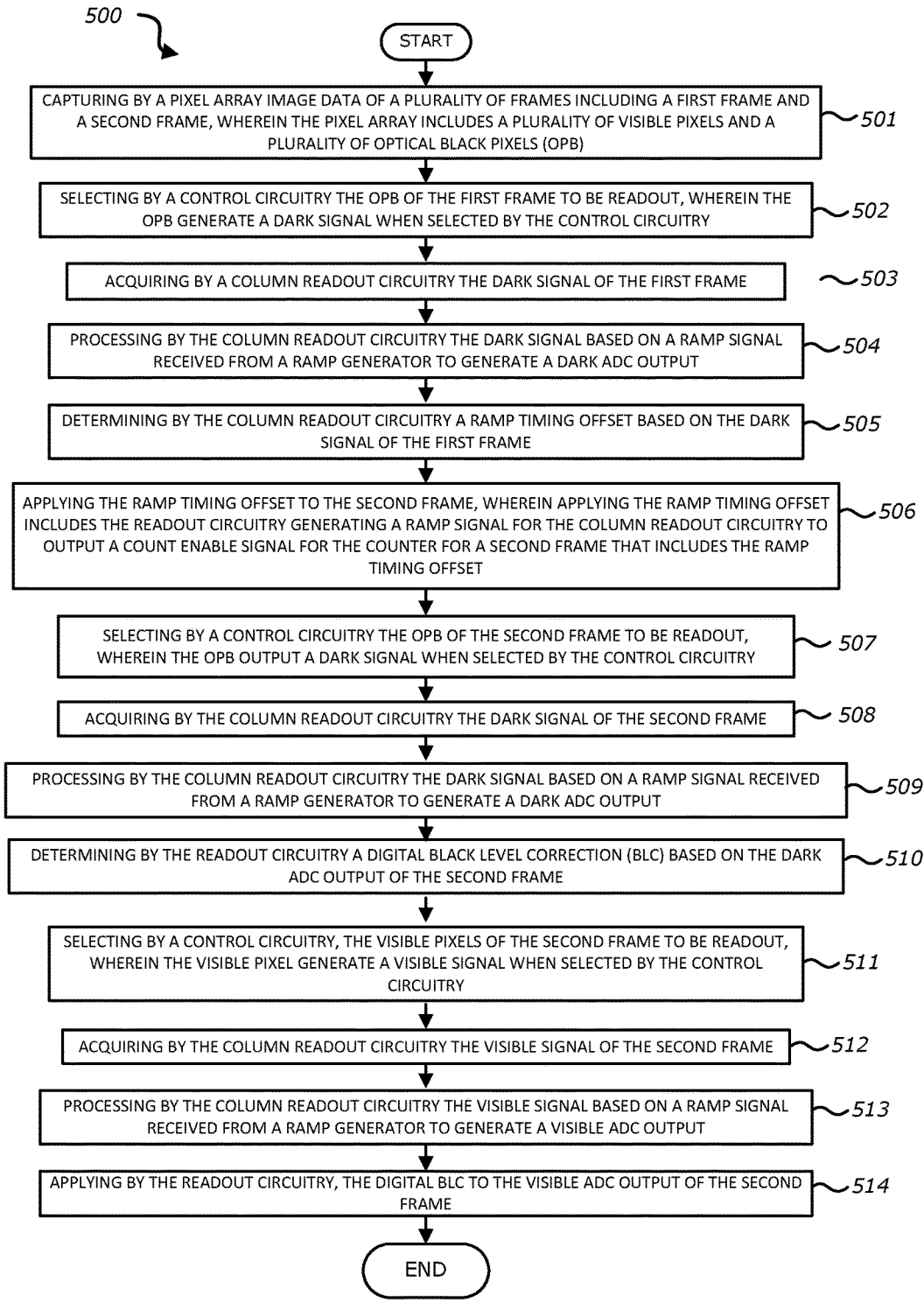
FIG. 5 is a flowchart illustrating a method for reducing the analog-to-digital conversion (ADC) time for dark signals in accordance to a first embodiment of the invention.

FIG. 5 is a flowchart illustrating a method 500 for reducing the analog-to-digital conversion (ADC) time for dark signals in accordance to a first embodiment of the invention. The method 500 starts with pixel array 105 capturing image data of a plurality of frames including a first frame and a second frame at Block 501. Second frame may be subsequent to the first frame. Pixel array 105 may include a plurality of visible pixels and a plurality of optical black pixels (OPB). At Block 502, control circuitry 120 selects the OPB of the first frame to be readout. The OPB generates a dark signal when selected by control circuitry 120. At Block 503, column readout circuitry 220 acquires the dark signal of the first frame and at Block 504, column readout circuitry 220 processes the dark signal based on a ramp signal received from ramp generator 250 to generate a dark ADC output. In one embodiment, processing the dark signal includes comparator 310 comparing the dark signal of the first frame the ramp signal in order to output a comparator output signal, and counter 320 counting based on an ADC clock signal and the comparator output signal to generate the dark ADC output. Comparator 310 and counter 320 may be included in column readout circuitry 220.

At Block 505, column readout circuitry 110 determines a ramp timing offset based on the dark signal of the first frame. In some embodiments, ramp generator 250 determines the ramp timing offset based on the dark signal of the first frame. At Block 506, the ramp timing offset is applied to the second frame. In one embodiment, applying the ramp timing offset includes readout circuitry 110 generating a ramp signal for column readout circuitry 220 to output a count enable signal for the counter for a second frame that includes the ramp timing offset. In one embodiment, applying the ramp timing offset further includes generating using a phase locked loop (PLL) a clock signal and generating by clock divider 240 included in logic circuitry 108 the ADC clock signal. The clock divider 240 generates the ADC clock signal by dividing the clock signal received from the PLL. In one embodiment, applying the ramp timing offset further includes ramp generator 250 included in readout circuitry 110 receiving the ADC clock signal and generating the ramp signal that is synchronized to the ADC clock signal. In this embodiment, the ramp signal includes the ramp timing offset. In one embodiment, applying the ramp timing offset further includes generating using system controller 260 signals to control image sensor 100 based on the system clock signal. In one embodiment, the ramp timing offset is applied to the first frame or to the second frame.

At Block 507, control circuitry 120 selects the OPB of the second frame to be readout, wherein the OPB output a dark signal when selected by control circuitry 120. At Block 508, column readout circuitry 220 acquires the dark signal of the second frame.

At Block 509, column readout circuitry 220 processes the dark signal of the second frame based on a ramp signal received from ramp generator 250 to generate a dark ADC output. In one embodiment, processing the dark signal includes comparator 310 comparing the dark signal of the second frame to the ramp signal in order to output a comparator output signal, and counter 320 counting based on an ADC clock signal and the comparator output signal to generate the dark ADC output. Comparator 310 and counter 320 may be included in column readout circuitry 220.

At Block 510, readout circuitry 110 determines digital black level correction (BLC) based on the dark signal of the second frame. In some embodiments, the digital BLC is determined after the ADC timing control because the resolution of digital BLC is more precise than the ADC resolution. At Block 511, control circuitry 120 selects the visible pixels of the second frame to be readout. The visible pixels generate a visible signal when selected by control circuitry 120. At Block 512, column readout circuitry 220 acquires the visible signal of the second frame. At Block 513, column readout circuitry 220 processes the visible signal of the second frame based on the ramp signal to generate a visible ADC output. In one embodiment, processing by column readout circuitry 220 the visible signal of the second frame includes comparing by comparator 310 included in column readout circuitry 220 the visible signal of the second frame the ramp signal to output a comparator output signal and counting by counter 320 included in column readout circuitry 220 based on ADC clock signal and the comparator output signal to generate the visible ADC output. In one embodiment, function logic 115 processes the visible and dark ADC outputs from the column readout circuitry to generate a final ADC output. At Block 514, applying by the readout circuitry 110, the digital BLC is applied to the visible ADC output of the second frame.

Figure 6:
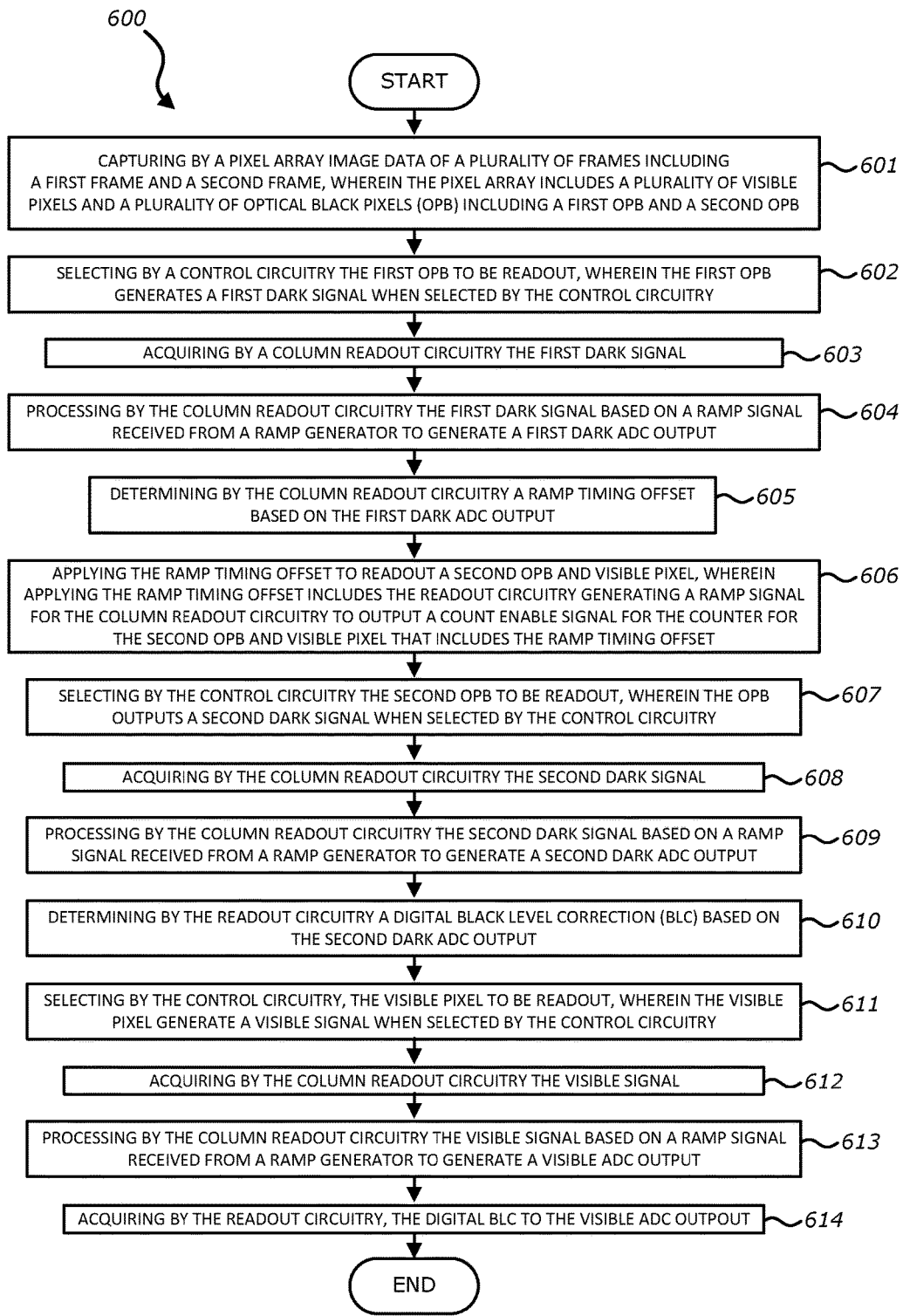
FIG. 6 is a flowchart illustrating a method for reducing the analog-to-digital conversion (ADC) time for dark signals in accordance to a second embodiment of the invention.

FIG. 6 is a flowchart illustrating a method 600 for reducing the analog-to-digital conversion (ADC) time for dark signals in accordance with a second embodiment of the invention.

The method 600 starts at Block 601 with pixel array 105 capturing image data of a plurality of frames including a first frame and a second frame. The second frame may be subsequent to the first frame. Pixel array 105 includes a plurality of visible pixels and a plurality of optical black pixels (OPB) including a first OPB and a second OPB. At Block 602, control circuitry 120 selects the first OPB of the first frame to be readout to obtain a first dark signal. The OPB generate a dark signal when selected by control circuitry 120. At Block 603, column readout circuitry 220 acquires the first dark signal of the first frame. At Block 604, column readout circuitry 220 processes the first dark signal based on a ramp signal received from ramp generator 250 to generate a first dark ADC output. At Block 605, column readout circuitry 110 determines a ramp timing offset based on the first dark ADC output. In some embodiments, ramp generator 250 determines the ramp timing offset based on the first dark ADC output. At Block 606, the ramp timing offset is applied to the second OPB and visible pixels of the first frame. In one embodiment, applying the ramp timing offset includes readout circuitry 110 generating the ramp signal for column readout circuitry 220 to output a count enable signal for the counter for the second OPB and visible pixels of the first frame that includes the ramp timing offset. In one embodiment, applying the ramp timing offset further includes a phase locked loop (PLL) 230 generating a clock signal and a clock divider 240 generating the ADC clock signal. PLL 230 and clock divider 240 may be included in logic circuitry 108. The clock divider 240 generates the ADC clock signal by dividing the clock signal received from the PLL 230. In one embodiment, applying the ramp timing offset further includes ramp generator 250 included in readout circuitry 110 receiving the ADC clock signal and generating the ramp signal that is synchronized to the ADC clock signal. In this embodiment, the ramp signal includes the ramp timing offset. In one embodiment, applying the ramp timing offset further includes generating using system controller 260 signals to control image sensor 100 based on the system clock signal. In one embodiment, the ramp timing offset is applied to the first frame or to the second frame.

At Block 607, control circuitry 120 selects the second OPB of the first frame to be readout, wherein the OPB output a dark signal when selected by control circuitry 120. At Block 608, column readout circuitry 220 acquires the second dark signal of the first frame.

At Block 609, column readout circuitry 220 processes the second dark signal of the first frame based on a ramp signal received from ramp generator 250 to generate a second dark ADC output. In one embodiment, processing the second dark signal includes comparator 310 comparing the second dark signal of the first frame to the ramp signal in order to output a comparator output signal, and counter 320 counting based on an ADC clock signal and the comparator output signal to generate the second dark ADC output. Comparator 310 and counter 320 may be included in column readout circuitry 220.

At Block 610, readout circuitry 110 determines digital black level correction (BLC) based on the second dark signal of the first frame. At Block 611, control circuitry 120 selects the visible pixels of the first frame to be readout, wherein the visible pixels generate a visible signal when selected by control circuitry 120.

At Block 612, column readout circuitry 220 acquires the visible signal of the first frame. At Block 613, column readout circuitry 220 processes the visible signal of the first frame based on the ramp signal to generate a visible ADC output. In one embodiment, processing by column readout circuitry 220 the visible signal of the first frame includes comparing by comparator 310 included in column readout circuitry 220 the visible signal of the first frame the ramp signal to output a comparator output signal and counting by counter 320 included in column readout circuitry 220 based on ADC clock signal and the comparator output signal to generate the visible ADC output. In one embodiment, function logic 115 processes the visible and dark ADC outputs from the column readout circuitry 220 to generate a final ADC output. At Block 614, the digital BLC is applied to the visible ADC output of the first frame. In accordance to the methods 500 and 600, (i) the time for ADC of dark signal is reduced thus increasing the frame rate of image sensor 100 compared to having only digital BLC, and (ii) the area and power requirements as well as the horizontal random noise are reduced compared to the analog BLC solutions.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
   a pixel array for acquiring image data of a plurality of frames including a first frame and a second frame, wherein the pixel array includes a plurality of visible pixels and a plurality of optical black pixels (OPB);
   a control circuitry that includes a scanning circuitry to select pixels to be readout, wherein the visible pixels generate a visible signal of the first frame and a visible signal of the second frame when selected by the scanning circuitry and the OPB generate a dark signal of the first frame and a dark signal of the second frame when selected by the scanning circuitry;
   a readout circuitry coupled to the pixel array to receive a signal from the pixel array, wherein the readout circuitry includes:
   a ramp generator to generate a ramp signal that is synchronized to an analog-to-digital conversion (ADC) clock signal, wherein the ramp signal includes a ramp timing offset based on the dark signal of the first frame, wherein the ramp timing offset is applied to the first frame or the second frame,
   a column readout circuitry that receives the visible signal and the dark signal of the first frame or receives the visible signal and the dark signal of the second frame, wherein the column readout circuitry includes:
   a comparator to compare the dark signal of the first frame from the pixel array to the ramp signal or to compare the dark signal of the second frame from the pixel array to the ramp signal, and to output a comparator output signal, and
   an ADC counter to count based on an ADC clock signal and the comparator output signal to generate an ADC output of the first frame or the second frame; and
   a logic circuitry to control the readout circuitry, the logic circuitry including: a clock divider to generate the ADC clock signal.

2. The image sensor of claim 1, wherein the logic circuitry further comprises:
   a phase locked loop (PLL) to generate a clock signal, wherein the clock divider divides the clock signal from the PLL to generate the ADC clock signal and a system clock signal; and a system controller to generate signals to control the image sensor based on the system clock signal.

3. The image sensor of claim 2, wherein the second frame is subsequent to the first frame.

4. The image sensor of claim 3, wherein the readout circuitry determines a digital black level correction (BLC) based on the dark signal of the second frame and applies the digital BLC to the visible signal of the second frame.

5. A method for reducing analog-to-digital conversion (ADC) time for dark signals comprising:
capturing by a pixel array image data of a plurality of frames including a first frame and a second frame, wherein the pixel array includes a plurality of visible pixels and a plurality of optical black pixels (OPB);
selecting by a scanning circuitry included in a control circuitry the OPB of the first frame to be readout, wherein the OPB generate a dark signal of the first frame and a dark signal of the second frame when selected by the scanning circuitry;
acquiring by a column readout circuitry included in a readout circuitry the dark signal of the first frame;
processing by the column readout circuitry the dark signal of the first frame based on a ramp signal received from a ramp generator included in the readout circuitry to generate a dark ADC output of the first frame;
determining by the readout circuitry a ramp timing offset based on the dark signal of the first frame; and
applying the ramp timing offset to the second frame, wherein applying the ramp timing offset includes generating by the ramp generator the ramp signal for a second frame that includes the ramp timing offset.

6. The method of claim 5, further comprising:
processing by the column readout circuitry the dark signal of the second frame based on the ramp signal received from the ramp generator included in the readout circuitry to generate a dark ADC output of the second frame;
determining by the readout circuitry a digital black level correction (BLC) based on the dark signal of the second frame;
selecting by the scanning circuitry the visible pixels of the second frame to be readout, wherein the visible pixels generate a visible signal when selected by the scanning circuitry;
acquiring by the column readout circuitry the visible signal of the second frame and applying the digital BLC to the visible signal of the second frame.

7. The method of claim 6, further comprising:
processing by the column readout circuitry the visible signal of the second frame based on the ramp signal to generate a visible ADC output of the second frame, wherein processing by the column readout circuitry the visible signal of the second frame includes:
comparing by a comparator included in the column readout circuitry the visible signal of the second frame to the ramp signal and outputting a comparator output signal, and counting by an ADC counter included in the column readout circuitry based on an ADC clock signal and the comparator output signal to generate the visible ADC output of the second frame.

8. The method of claim 7, wherein the column readout circuitry processing the dark signal of the second frame includes:
comparing by the comparator included in the column readout circuitry the dark signal of the second frame to the ramp signal and outputting the comparator output signal, and counting by the ADC counter included in the column readout circuitry based on the ADC clock signal and the comparator output signal to generate the dark ADC output of the second frame.

9. The method of claim 8, wherein applying the ramp timing offset further includes the logic circuitry:
generating by a clock divider included in the logic circuitry the ADC clock signal, receiving by the ramp generator included in the readout circuitry the ADC clock signal, and generating by the ramp generator the ramp signal that is synchronized to the ADC clock signal, wherein the ramp signal includes a ramp timing offset.

10. The method of claim 9, wherein applying the ramp timing offset further includes the logic circuitry:
generating using a phase locked loop (PLL) a clock signal, wherein the clock divider divides the clock signal from the PLL to generate the ADC clock signal and a system clock signal; and
generating using a system controller signals to control the image sensor based on the system clock signal.

11. The method of claim 10, wherein the scanning circuitry is included in a control circuitry.

12. The method of claim 11, further comprising:
processing by function logic the ADC outputs from the column readout circuitry to generate a final ADC output.

13. A method for reducing analog-to-digital conversion (ADC) time for dark signals comprising:
capturing by a pixel array image data of a plurality of frames including a first frame and a second frame, wherein the pixel array includes a plurality of visible pixels and a plurality of optical black pixels (OPB);
selecting by a scanning circuitry included in a control circuitry the OPB of the first frame to be readout twice to obtain a first dark signal and a second dark signal, wherein the OPB generate a dark signal when selected by the scanning circuitry;
acquiring by a column readout circuitry included in a readout circuitry the first dark signal of the first frame and the second dark signal of the first frame;
processing by the column readout circuitry the first dark signal based on a ramp signal received from a ramp generator included in the readout circuitry to generate a first dark ADC output;
determining by the readout circuitry a ramp timing offset based on the first dark signal of the first frame; and
applying the ramp timing offset to the second dark signal of the first frame, wherein applying the ramp timing offset includes generating by the ramp generator the ramp signal that includes the ramp timing offset.

14. The method of claim 13, further comprising:
determining by the readout circuitry a digital black level correction (BLC) based on the second dark signal of the first frame;
selecting by the scanning circuitry the visible pixels of the first frame to be readout, wherein the visible pixels generate a visible signal of the first frame when selected by the scanning circuitry; and
acquiring by the column readout circuitry the visible signal of the first frame and applying the digital BLC to the visible signal of the first frame.

15. The method of claim 14, further comprising:
processing by the column readout circuitry the visible signal of the first frame based on the ramp signal to generate a visible ADC output, wherein processing by the column readout circuitry the visible signal of the first frame includes:

comparing by a comparator included in the column readout circuitry the visible signal of the first frame to the ramp signal and outputting a comparator output signal, and counting by an ADC counter included in the column readout circuitry based on an ADC clock signal and the comparator output signal to generate the visible ADC output.

16. The method of claim 15, wherein the column readout circuitry processing the first dark signal of the first frame includes:

comparing by the comparator included in the column readout circuitry the dark signal of the first frame to the ramp signal and outputting a second comparator output signal, and counting by the ADC counter included in the column readout circuitry based on the ADC clock signal and the second comparator output signal to generate the dark ADC output.

17. The method of claim 16, wherein applying the ramp timing offset further includes the logic circuitry:

generating by a clock divider included in the logic circuitry the ADC clock signal, receiving by the ramp generator included in the readout circuitry the ADC clock signal, and generating by the ramp generator the ramp signal that is synchronized to the ADC clock signal.

18. The method of claim 17, wherein applying the ramp timing offset further includes the logic circuitry:

generating using a phase locked loop (PLL) a clock signal, wherein the clock divider divides the clock signal from the PLL to generate the ADC clock signal and a system clock signal; and generating using a system controller signals to control the image sensor based on the system clock signal.

* * * * *